United States Patent
Gross-Petersen

(10) Patent No.: US 10,195,545 B2
(45) Date of Patent: Feb. 5, 2019

(54) SEPARATING SYSTEM AND METHOD FOR SEPARATING LIQUID AND GAS FLOWING THROUGH A MULTIPHASE PIPE

(71) Applicant: Maersk Olie og Gas A/S, Copenhagen (DK)

(72) Inventor: Jorgen Frederik Gross-Petersen, Virum (DK)

(73) Assignee: TOTAL E & P DANMARK A/S (DK)

( * ) Notice: Subject to any disclaimer, the term of this patent is extended or adjusted under 35 U.S.C. 154(b) by 200 days.

(21) Appl. No.: 15/125,890

(22) PCT Filed: Jan. 27, 2015

(86) PCT No.: PCT/EP2015/051592
§ 371 (c)(1),
(2) Date: Sep. 13, 2016

(87) PCT Pub. No.: WO2015/121058
PCT Pub. Date: Aug. 20, 2015

(65) Prior Publication Data
US 2017/0036141 A1      Feb. 9, 2017

(30) Foreign Application Priority Data
Feb. 12, 2014   (GB) .................................. 1402424.4

(51) Int. Cl.
*B01D 19/00*      (2006.01)
*E21B 43/36*      (2006.01)

(52) U.S. Cl.
CPC ..... *B01D 19/0063* (2013.01); *B01D 19/0073* (2013.01); *E21B 43/36* (2013.01)

(58) Field of Classification Search
CPC ................ B01D 19/00; B01D 19/0063; B01D 19/0073; E21B 43/36; E21B 43/38; E21B 43/385; E21B 43/40

(Continued)

(56) References Cited

U.S. PATENT DOCUMENTS

| 6,651,745 B1 | 11/2003 | Lush et al. |
| 2003/0205384 A1* | 11/2003 | Lush ....................... E21B 43/01 166/357 |
| 2010/0155075 A1 | 6/2010 | Holm |

FOREIGN PATENT DOCUMENTS

| WO | 2008140319 A1 | 11/2008 |
| WO | 2011073203 A1 | 6/2011 |
| WO | 2014029854 A1 | 2/2014 |

OTHER PUBLICATIONS

Search report for Great Britain Application No. GB1402424.4, dated Aug. 29, 2014.

(Continued)

*Primary Examiner* — T. Bennett McKenzie

(74) *Attorney, Agent, or Firm* — Brinks Gilson & Lione

(57) ABSTRACT

A separating system (1) includes a riser (3) for receiving fluid from a multi-phase pipe (2) and for delivering gas to a subsea gas pipeline (8) through a gas delivering pipe (9). A liquid receiving pipe (12) has a lower end (14) with a liquid intake (15) being adapted to receive liquid from a liquid column (6) in the riser. A liquid delivering pipe (16) has an upper end (17) adapted to receive liquid from an upper end (13) of the liquid receiving pipe (12) and a lower end (18) adapted to deliver liquid to a subsea liquid pipeline (19). A level control system (22) controls the level of the surface of the liquid column by regulation of the liquid flow rate to the liquid pipeline. The riser encloses the liquid receiving pipe, the liquid delivering pipe and the gas delivering pipe. A method for separating is furthermore disclosed.

16 Claims, 1 Drawing Sheet

(58) Field of Classification Search
USPC .................................................. 95/19–22
See application file for complete search history.

(56) References Cited

OTHER PUBLICATIONS

International Preliminary Report on Patentability for PCT/EP2015/051592, completed Jun. 23, 2015.
International Search Report and Written Opinion for PCT/EP2015/051592, dated Jun. 23, 2015.

* cited by examiner

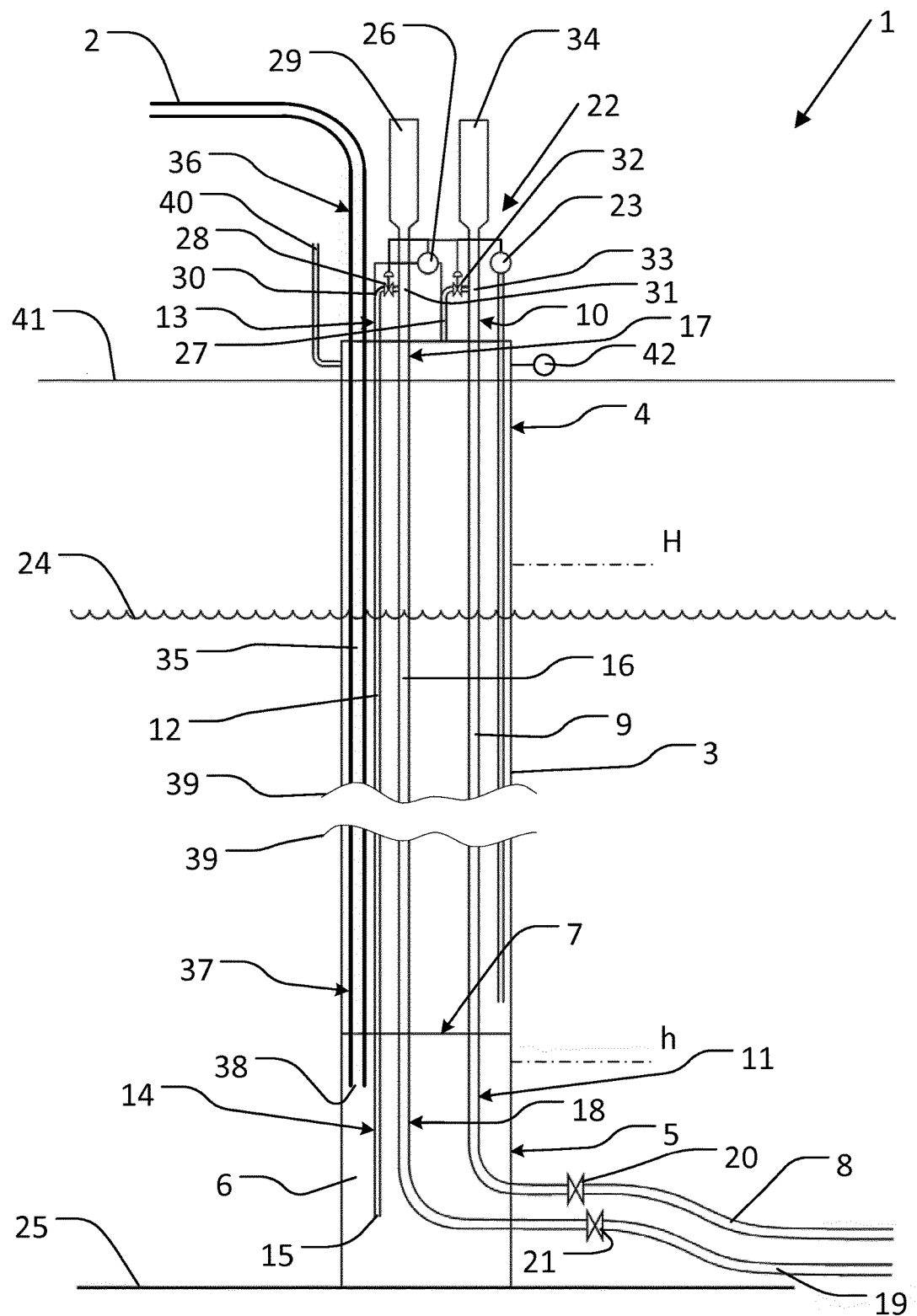

SEPARATING SYSTEM AND METHOD FOR SEPARATING LIQUID AND GAS FLOWING THROUGH A MULTIPHASE PIPE

RELATED APPLICATIONS

This application claims the benefit under 35 U.S.C. § 371 of the filing date of International Patent Application No. PCT/EP2015/051592, having an international filing date of Jan. 27, 2015, which claims priority to Great Britain Application No. 1402424.4, filed Feb. 12, 2014, the contents of both of which are incorporated herein by reference in their entirety.

BACKGROUND

FIELD

The present invention relates to a separating system for separating liquid and gas flowing through a multiphase pipe, the separating system including a riser having an upper end and a lower end and being adapted to receive fluid from the multiphase pipe, the upper end of the riser being adapted to deliver gas to a gas pipeline, a liquid receiving pipe having an upper end and a lower end, the lower end of the liquid receiving pipe being arranged at the lower end of the riser and having a liquid intake being adapted to receive liquid from a liquid column in the riser, the upper end of the liquid receiving pipe being arranged at the upper end of the riser and being adapted to deliver liquid to a liquid pipeline, the separating system including a level control system adapted to control the level of the surface of the liquid column in the riser on the basis of measurements performed by at least one sensor included by the level control system.

DESCRIPTION OF RELATED ART

US 2003/0205384 A1 discloses a subsea riser separator system including a vertical liquid/vapor separator adapted to be placed on the seabed and a riser assembly connecting the separator with surface processing facilities. The separator comprises a multi-phase separator inlet connected to a subsea pipeline and a liquid outlet port connected to a hydraulically-driven centrifugal pump placed on the seabed. The pressurized outlet line from the pump assembly is by means of a separate pipe connected to a connector block and thereby fluidly connected to an interior tubing of a two-concentric-piped riser assembly. The separated vapor from the tubular separator rises through the connector block to the annulus outside of the inner conduit and within the concentric riser assembly. However, this separator system is specifically designed for the separation of liquid and gas received through a subsea pipeline from a subsea well and for the subsequent transportation of the separated products to surface processing facilities. Furthermore, due to the complex configuration of this separator system including several parts, in particular the pump, exposed to deep subsea conditions, maintenance of the system may be a challenge.

WO 2008/140319 A1 discloses a method for control of liquid or liquid slugs transported in a multiphase fluid pipeline, for instance from a subsea production system, including a multiphase pipeline for the transportation of a fluid, consisting of mainly gas and some liquid such as water and/or gas condensate. The gas is evacuated via a gas separation unit connected to the multi-phase pipeline to a second gas transport pipe, and the liquid is fed to a dedicated pipeline section acting as a buffer volume pipeline. The separation unit includes one or several vertical pipes connected at a distance from one another along the multiphase pipeline, whereby the gas is transported separately to a downstream processing facility on a platform or onshore or the like, and whereby the liquid proceeds to the loop which may preferably be an extension of the multiphase pipeline, or the liquid and gas may be re-combined and led in a common transport pipeline to the desired destination.

WO 2011/073203 discloses a separating system for gaseous and liquid effluents of an underwater well, including a riser provided with an upper portion for lifting substantially gaseous components to a gas processing or receiving facility above the water surface and an inclined gas-liquid separator having a liquid collecting chamber. A liquid pump assembly pumps substantially liquid components from the liquid collecting chamber through a separate liquid riser to a liquid processing facility above the water surface.

BRIEF SUMMARY

The object of the present invention is to provide a separating system suitable for receiving liquid and gas from a multiphase pipe above sea level and delivering separated products to subsea pipelines, whereby maintenance is minimized and facilitated.

In view of this object, the upper end of the riser is provided with an inlet for connect ion with the multiphase pipe, the separating system includes a gas delivering pipe having an upper end adapted to receive gas from the upper end of the riser and a lower end adapted to deliver gas to a subsea gas pipeline, the separating system includes a liquid delivering pipe having an upper end adapted to receive liquid from the upper end of the liquid receiving pipe and a lower end adapted to deliver liquid to a subsea liquid pipeline, and the riser forms a caisson enclosing the liquid receiving pipe, the liquid delivering pipe and the gas delivering pipe.

In this way, the caisson formed by the riser may protect the internal piping and reduce wave drag on the entire separating system, thereby reducing the requirement for maintenance. Furthermore, because a liquid delivering pipe is arranged to receive liquid from the upper end of the liquid receiving pipe, means for regulating the liquid flow rate to the liquid pipeline, such as a control valve or pump, may be arranged above sea level or be accessible from above the sea level, whereby maintenance may be greatly facilitated.

In an embodiment, the level control system is adapted to regulate the liquid flow rate to the subsea liquid pipeline. The liquid flow rate is preferably regulated by means of a liquid control valve arranged between the upper end of the liquid receiving pipe and the upper end of the liquid delivering pipe. Thereby, maintenance may be facilitated in that the valve is easily accessible above sea level.

In an embodiment, the level control system is adapted to regulate the liquid flow rate to the subsea liquid pipeline by means of a submerged pump arranged in the liquid receiving pipe at the lower end thereof and so that the submerged pump is retrievable up through a guide. Thereby, the liquid pressure may be boosted considerable and maintenance may at the same time be facilitated in that the pump is easily accessible above sea level.

In an embodiment, the level control system includes a gas control valve arranged between the upper end of the riser and the upper end of the gas delivering pipe. Thereby, it may be ensured that the back pressure above the liquid column in the riser is high enough to lift the liquid up through the liquid receiving pipe, and maintenance may at the same time be facilitated in that the gas control valve is easily accessible above sea level.

In an embodiment, the separating system includes a multiphase receiving pipe having an upper end adapted to connect to the multiphase pipe and a lower end in fluid communication with the lower end of the riser, and the caisson formed by the riser encloses the multiphase receiving pipe. Thereby, the liquid and gas received from the multiphase pipe may be delivered to the liquid column at a position below the surface of the liquid column so that foam format ion may be suppressed, and at the same time, the multiphase receiving pipe may be protected by the caisson formed by the riser, thereby reducing wave drag on the entire separating system and thereby reducing the requirement for maintenance.

In an embodiment, the upper end of the liquid delivering pipe is provided with a liquid pig launcher, and, preferably, the upper end of the gas delivering pipe is provided with a gas pig launcher. Thereby, pigging operations may easily be carried out, thereby facilitating maintenance.

In an embodiment, the at least one sensor has the form of a liquid level gauge, such as a radar level gauge or a nucleonic level gauge arranged to be accessible from the upper end of the riser. Thereby, maintenance of the at least one sensor may be facilitated.

In an embodiment, the at least one sensor has the form of a differential pressure gauge arranged to measure the pressure differential between the gas at
the upper end of the riser and the liquid at the upper end of the liquid receiving pipe. Thereby, maintenance of the at least one sensor may be facilitated.

The present invention further relates to a method of separating liquid and gas flowing through a multiphase pipe by means of a riser having an upper end and a lower end, whereby fluid is supplied from the multiphase pipe to the riser, whereby gas is delivered from the upper end of the riser to a gas pipeline, whereby a liquid receiving pipe having an upper end and a lower end is arranged so that liquid is received from a liquid column in the riser by a liquid intake provided at the lower end of the liquid receiving pipe and so that liquid is delivered from the upper end of the liquid receiving pipe to a liquid pipeline, whereby the level of the surface of the liquid column in the riser is controlled by a level control system on the basis of measurements of at least one variable depending on said level.

The method is characterized by providing the upper end of the riser with an inlet for connection with the multiphase pipe, by arranging a gas delivering pipe having an upper end and a lower end so that the upper end of the gas delivering pipe receives gas from the upper end of the riser and the lower end of the gas delivering pipe delivers gas to a subsea gas pipeline, by arranging a liquid delivering pipe having an upper end and a lower end so that the upper end of the liquid delivering pipe receives liquid from the upper end of the liquid receiving pipe and the lower end of the liquid delivering pipe delivers liquid to a subsea liquid pipeline, and by arranging the riser so that it forms a caisson enclosing the liquid receiving pipe, the liquid delivering pipe and the gas delivering pipe. Thereby, the above-mentioned features may be obtained.

In an embodiment, the liquid flow rate to the subsea liquid pipeline is regulated. The liquid flow rate is preferably regulated by means of a liquid control valve included by the level control system and arranged between the upper end of the liquid receiving pipe and the upper end of the liquid delivering pipe. Thereby, the above-mentioned features may be obtained.

In an embodiment, the liquid flow rate to the subsea liquid pipeline is regulated by means of a submerged pump included by the level control system and arranged in the liquid receiving pipe at the lower end thereof, and whereby the submerged pump is retrieved for maintenance up through the liquid receiving pipe. Thereby, the above-mentioned features may be obtained.

In an embodiment, back pressure above the liquid column in the riser is regulated by means of a gas control valve arranged between the upper end of the riser and the upper end of the gas delivering pipe. Thereby, the above-mentioned features may be obtained.

In an embodiment, a multiphase receiving pipe having an upper end and a lower end is arranged inside the caisson formed by the riser and so that the upper end of the multiphase receiving pipe receives liquid and gas from the multiphase pipe and the lower end of the multiphase receiving pipe delivers liquid and gas at the lower end of the riser. Thereby, the above-mentioned features may be obtained.

In an embodiment, the at least one variable measured is the actual position of the surface of the liquid column in the riser, and whereby said position is preferably measured by means of radar technique or nucleonic technique. Thereby, the above-mentioned features may be obtained.

In an embodiment, the at least one variable measured is a differential pressure between the gas at the upper end of the riser and the liquid at the upper end of the liquid receiving pipe. Thereby, the above-mentioned features may be obtained.

BRIEF DESCRIPTION OF THE DRAWINGS

The invention will now be explained in more detail below by means of examples of embodiments with reference to the very schematic drawing, in which FIG. 1 is a longitudinal cross-sectional view of the separating system according to the invention.

DETAILED DESCRIPTION

FIG. 1 shows a separating system 1 for separating liquid and gas flowing through a multiphase pipe 2. The separating system 1 includes a riser 3 having an upper end 4 and a lower end 5 and is adapted to receive fluid from the multiphase pipe 2, whereby a liquid column 6 having a surface 7 may be formed in the riser 3. The upper end 4 of the riser 3 is adapted to deliver gas to a subsea gas pipeline 8 by means of a gas delivering pipe 9 arranged inside the riser 3 and having an upper end 10 adapted to receive gas from the upper end 4 of the riser 3 and a lower end 11 adapted to deliver gas to the subsea gas pipeline 8.

The upper end 4 of the riser 3 may typically be carried by a platform deck 41, and the riser 3 may or may not extend to the seabed 25. The length of the riser 3 may vary, but typically, a riser length of up to 150 meters or even more, but for instance 50-100 meters or 60-70 meters could be suitable. The water depth could typically be up to 150 meters or even more. The diameter of the riser 3 could for instance be 1-2 meters, or preferably about a 1.5 meters. In the figure, the riser 3 has for illustrative purposes been separated by means of wave-formed lines 39, thereby indicating that for the cross-sectional dimension illustrated in the figure, the length of the riser 3 would typically be longer than could possibly be shown in the figure. The separating system 1 according to the invention may also work for a floating vessel, however, in that case, the riser 3 would not be bottom supported.

Furthermore, a liquid receiving pipe 12 has an upper end 13 and a lower end 14 is arranged inside the riser 3. The lower end 14 of the liquid receiving pipe
12 is arranged at the lower end 5 of the riser 3 and has a liquid intake 15 being adapted to receive liquid from the liquid column 6 in the riser 3. The upper end 13 of the liquid receiving pipe 12 is arranged at the upper end 4 of the riser 3 and is adapted to deliver liquid to a subsea liquid pipeline 19 by means of a liquid delivering pipe 16 arranged inside the riser 3 and having an upper end 17 adapted to receive liquid from the upper end 13 of the liquid receiving pipe 12 and a lower end 18 adapted to deliver liquid to the subsea liquid pipeline 19.

The separating system 1 includes a level control system 22 adapted to control the level of the surface 7 of the liquid column 6 in the riser 3 on the basis of measurements performed by at least one sensor included by the level control system 22. In the embodiment illustrated, the at least one sensor includes a liquid level gauge 23, such as a radar level gauge or a nucleonic level gauge. As it is seen, the liquid level gauge 23 is arranged extending from the top of the riser 3 down into the riser. Thereby, the liquid level gauge 23 may be accessible from the upper end 4 of the riser 3 and thereby above the sea level 24 so that maintenance is facilitated.

Furthermore, in the embodiment illustrated, the at least one sensor includes a differential pressure gauge 26 arranged to measure the pressure differential between the gas at the upper end 4 of the riser 3 and the liquid at the upper end 13 of the liquid receiving pipe 12. Therefore, as seen, the differential pressure gauge 26 is connected to tubing 27 communicating with the inside of the upper end 4 of the riser 3 and is connected to the upper end 13 of the liquid receiving pipe 12. For illustration purposes, both the liquid level gauge 23 and the differential pressure gauge 26 are shown in FIG. 1, although typically, one of these sensors will be sufficient.

Typically, the level control system 22 may seek maintaining the level of the surface 7 of the liquid column 6 between a lower minimum height h and an
upper maximum height H on the basis of input from the at least one sensor. In order to control the level of the surface 7 of the liquid column 6, the level control system 22 is adapted to regulate the liquid flow rate to the subsea liquid pipeline 19 by means of a liquid control valve 28 arranged between the upper end 13 of the liquid receiving pipe 12 and the upper end 17 of the liquid delivering pipe 16.

As seen in the figure, an upstream side (the left side in the figure) of the liquid control valve 28 is connected directly to the upper end 13 of the liquid receiving pipe 12 by means of a pipe bending 30, and a downstream side (the right side in the figure) of the liquid control valve 28 is connected by means of a pipe the 31 arranged in-line with the upper end 17 of the liquid delivering pipe 36, so that a liquid pig launcher 29 arranged on the top of the liquid delivering pipe 36 allows a pig to pass the connection between the liquid control valve 28 and the liquid delivering pipe 16 and thereby enter the entire length of the liquid delivering pipe 16. A not shown balancing line from upstream the liquid control valve 28 to the top of the liquid pig launcher 29 may ensure that pig launching may be carried out by gravity.

Alternatively, or additionally, to the liquid control valve 28, the level control system 22 may be adapted to regulate the liquid flow rate to the subsea liquid pipeline 19 by means of a not shown submerged pump arranged in the liquid receiving pipe 12 at the lower end 14 thereof so that the submerged pump is retrievable up through the liquid receiving pipe 12. Thereby, maintenance may be facilitated, as the pump may be accessible from above the sea level 24.

Furthermore, in order to ensure that the back pressure above the liquid column 6 in the riser 3 is high enough to lift the liquid up through the liquid receiving pipe 12, the level control system 22 may include a gas control valve 32 arranged between the upper end of the riser 3 and the upper end 10 of
the gas delivering pipe 9. Maintenance may be facilitated because the gas control valve 32 is easily accessible above sea level.

As seen in the figure, an upstream side (the left side in the figure) of the gas control valve 32 is connected directly to the upper end 4 of the riser 3 by means of the above-mentioned tubing 27 including a pipe bending, and a downstream side (the right side in the figure) of the gas control valve 32 is connected by means of a pipe tee 33 arranged in-line with the upper end 10 of the gas delivering pipe 9, so that a gas pig launcher 34 arranged on the top of the gas delivering pipe 9 allows a pig to pass the connection between the gas control valve 32 and the gas delivering pipe 9 and thereby enter the entire length of the gas delivering pipe 9. A not shown balancing line from upstream the gas control valve 32 (or from the top of the riser 3) to the top of the gas pig launcher 34 may ensure that pig launching may be carried out by gravity.

According to the invention, there may be contemplated different regulation options for the level of the surface 7 of the liquid column 6 in the riser 3 (in the following denoted liquid level). For instance, the liquid level may be measured directly by means of the liquid level gauge 23. Thereby, the liquid level may be controlled by the liquid control valve 28 or a not shown submerged pump arranged in the liquid receiving pipe 12, with the gas control valve 32 providing sufficient back pressure in the riser 3 for lifting of liquid up through the liquid receiving pipe 12. The liquid control valve 28 may not be required with this mode of regulation, but a regulation of the gas overpressure in the riser 3 by means of the gas control valve 32 may be needed to ensure that liquid may be lifted up through the liquid receiving pipe 12. Additionally, the differential pressure gauge 26 and/or a pressure gauge 42 measuring the absolute pressure in the upper end 4 of the riser 3 may be provided for control of the liquid level and for ensuring that sufficient back pressure is present in the riser 3 in order to lift the liquid up through the liquid receiving pipe 12.

In another embodiment, the liquid level may be controlled by the liquid control valve 28 by measuring the liquid level indirectly by means of the differential pressure gauge 26. The gas control valve 32 may have to be used to provide control of the back pressure in the riser 3. The liquid level in the riser 3 may need to be monitored by additional means, for instance by means of the liquid level gauge 23, and possibly thereby controlled to stay within acceptable limits in the riser 3. Additionally, or alternatively to the differential pressure gauge 26 in this embodiment, the pressure gauge 42 measuring the absolute pressure in the upper end 4 of the riser 3 may be provided for control of the liquid level and for ensuring that sufficient back pressure is present in the riser 3 in order to lift the liquid up through the liquid receiving pipe 12.

The skilled person will understand that different combinations of the above mentioned liquid level regulation options may be employed.

In the embodiment illustrated, the separating system 1 includes a multiphase receiving pipe 35 having an upper 36 end connected to the multiphase pipe 2 and a lower end 37 in fluid communication with the lower end 5 of the riser 3. Preferably, an outflow opening 38 of the lower end 37 of the multiphase receiving pipe 35 is positioned below the lower minimum height h of the liquid column 6. Thereby, foam formation of the inflowing liquid and gas may be suppressed. The riser 3 may at its upper end 4 be provided with at relief and blow-down connection tube 40.

The riser 3 forms a caisson enclosing the multiphase receiving pipe 35, the liquid receiving pipe 12, the liquid delivering pipe 16 and the gas delivering pipe 9. Thereby, the caisson formed by the riser 3 may protect the internal piping and reduce wave drag on the entire separating system 1, thereby reducing the requirement for maintenance.

The subsea gas pipeline 8 extends on the seabed 25 and is connected to the lower end 11 of the gas delivering pipe 9 through the wall of the caisson formed by the riser 3. Likewise, the subsea liquid pipeline 19 extends on the seabed 25 and is connected to the lower end 38 of the liquid delivering pipe 36 through the wall of the caisson formed by the riser 3. Outside the riser 3, the subsea gas pipeline 8 and the subsea liquid pipeline 19, respectively, may be provided with stop valves 20, 21.

Compared to a conventional two-phase separator placed on a platform, the separating system 1 according to the invention requires no space on the platform, it loads the platform less, and it requires less maintenance, as fewer parts in the form of tubing, fittings, among others, are present on the platform.

It should be noted that, if required, boosting could be arranged as
- multiphase or possibly even single phase boosting prior to the separating system 1
- liquid boosting downstream the liquid control valve 28 on top of the riser 3 and upstream the liquid pig launcher 29
- gas boosting on top of the riser 3, upstream of the gas pig launcher 34
- subsea gas and/or liquid boosting.

The gas boosting could be made in steps, if more than a 3 to 1 boosting would be required with cooling by seawater in between the compression steps.

The invention claimed is:

1. A separating system for separating liquid and gas flowing through a multiphase pipe, the separating system including:
   a riser having an upper end and a lower end and being adapted to receive fluid from the multiphase pipe, the upper end of the riser being adapted to deliver gas to a gas pipeline;
   a liquid receiving pipe having an upper end and a lower end, the lower end of the liquid receiving pipe being arranged at the lower end of the riser and having a liquid intake being adapted to receive liquid from a liquid column in the riser, the upper end of the liquid receiving pipe being arranged at the upper end of the riser and being adapted to deliver liquid to a subsea liquid pipeline;
   a level control system adapted to control the level of the surface of the liquid column in the riser on the basis of measurements performed by at least one sensor included by the level control system;
   an inlet for connection with the multiphase pipe arranged on the upper end of the riser;
   a gas delivering pipe having an upper end adapted to receive gas from the upper end of the riser and a lower end adapted to deliver gas to a subsea gas pipeline; and
   a liquid delivering pipe having an upper end adapted to receive liquid from the upper end of the liquid receiving pipe and a lower end adapted to deliver liquid to a subsea liquid pipeline, wherein the liquid receiving pipe delivers liquid to the subsea liquid pipeline via the liquid delivering pipe,
   wherein the riser forms a caisson enclosing the liquid receiving pipe, the liquid delivering pipe and the gas delivering pipe.

2. The separating system according to claim 1, wherein the level control system is adapted to regulate the liquid flow rate to the subsea liquid pipeline via a liquid control valve arranged between the upper end of the liquid receiving pipe and the upper end of the liquid delivering pipe.

3. The separating system according to claim 1, wherein the level control system is adapted to regulate the liquid flow rate to the subsea liquid pipeline by means of a submerged pump arranged in the liquid receiving pipe at the lower end thereof and so that the submerged pump is retrievable up through a guide.

4. The separating system according to claim 1, wherein the level control system includes a gas control valve arranged between the upper end of the riser and the upper end of the gas delivering pipe.

5. The separating system according to claim 1, wherein the separating system includes a multiphase receiving pipe having an upper end adapted to connect to the multiphase pipe and a lower end in fluid communication with the lower end of the riser, and wherein the caisson formed by the riser encloses the multiphase receiving pipe.

6. The separating system according to claim 1, wherein the upper end of the liquid delivering pipe is provided with a liquid pig launcher, and wherein the upper end of the gas delivering pipe is provided with a gas pig launcher.

7. The separating system according to claim 1, wherein the at least one sensor is a liquid level gauge arranged to be accessible from the upper end of the riser.

8. The separating system according to claim 1, wherein the at least one sensor is a differential pressure gauge arranged to measure the pressure differential between the gas at the upper end of the riser and the liquid at the upper end of the liquid receiving pipe.

9. A method of separating liquid and gas flowing through a multiphase pipe comprising:
   providing a riser having an upper end and a lower end, whereby fluid is supplied from the multiphase pipe to the riser, whereby gas is delivered from the upper end of the riser to a gas pipeline, whereby a liquid receiving pipe having an upper end and a lower end is arranged so that liquid is received from a liquid column in the riser by a liquid intake provided at the lower end of the liquid receiving pipe and so that liquid is delivered from the upper end of the liquid receiving pipe to a subsea liquid pipeline, whereby the level of the surface of the liquid column in the riser is controlled by a level control system on the basis of measurements of at least one variable depending on said level;
   providing the upper end of the riser with an inlet for connection with the multiphase pipe;
   arranging a gas delivering pipe having an upper end and a lower end so that the upper end of the gas delivering pipe receives gas from the upper end of the riser and the lower end of the gas delivering pipe delivers gas to a subsea gas pipeline;

arranging a liquid delivering pipe having an upper end and a lower end so that the upper end of the liquid delivering pipe receives liquid from the upper end of the liquid receiving pipe and the lower end of the liquid delivering pipe delivers liquid to a subsea liquid pipeline, wherein the liquid receiving pipe delivers liquid to the subsea liquid pipeline via the liquid delivering pipe; and arranging the riser so that it forms a caisson enclosing the liquid receiving pipe, the liquid delivering pipe and the gas delivering pipe.

10. The method according to claim 9, whereby the liquid flow rate to the subsea liquid pipeline is regulated via a liquid control valve included by the level control system and arranged between the upper end of the liquid receiving pipe and the upper end of the liquid delivering pipe.

11. A method according to claim 9, whereby the liquid flow rate to the subsea liquid pipeline is regulated by means of a submerged pump included by the level control system and arranged in the liquid receiving pipe at the lower end thereof, and whereby the submerged pump is retrieved for maintenance up through the liquid receiving pipe.

12. The method according to claim 9, whereby back pressure above the liquid column in the riser is regulated by means of a gas control valve arranged between the upper end of the riser and the upper end of the gas delivering pipe.

13. The method according to claim 9, whereby a multiphase receiving pipe having an upper end and a lower end is arranged inside the caisson formed by the riser and so that the upper end of the multiphase receiving pipe receives liquid and gas from the multiphase pipe and the lower end of the multiphase receiving pipe delivers liquid and gas at the lower end of the riser.

14. The method according to claim 9, whereby the at least one variable measured is the actual position of the surface of the liquid column in the riser, and whereby said position is measured by means of a radar technique or a nucleonic technique.

15. The method according to claim 9, whereby the at least one variable measured is a differential pressure between the gas at the upper end of the riser and the liquid at the upper end of the liquid receiving pipe.

16. A separating system for separating liquid and gas flowing through a multiphase pipe, the separating system including:
- a riser having an upper end and a lower end and being adapted to receive fluid from the multiphase pipe, the upper end of the riser being adapted to deliver gas to a gas pipeline;
- a liquid receiving pipe having an upper end and a lower end, the lower end of the liquid receiving pipe being arranged at the lower end of the riser and having a liquid intake being adapted to receive liquid from a liquid column in the riser, the upper end of the liquid receiving pipe being arranged at the upper end of the riser and being adapted to deliver liquid to a subsea liquid pipeline;
- a level control system that includes one or more of: a liquid control valve and a submerged pump, and at least one sensor, the level control system being adapted to control the level of the surface of the liquid column in the riser on the basis of measurements provided by the at least one sensor;
- an inlet for connection with the multiphase pipe arranged on the upper end of the riser;
- a gas delivering pipe having an upper end adapted to receive gas from the upper end of the riser and a lower end adapted to deliver gas to a subsea gas pipeline; and
- a liquid delivering pipe having an upper end adapted to receive liquid from the upper end of the liquid receiving pipe and a lower end adapted to deliver liquid to a subsea liquid pipeline, wherein the liquid receiving pipe delivers liquid to the subsea liquid pipeline via the liquid delivering pipe,
- wherein the riser forms a caisson enclosing the liquid receiving pipe, the liquid delivering pipe and the gas delivering pipe.

* * * * *